United States Patent
Forlivesi et al.

(10) Patent No.: US 8,423,617 B2
(45) Date of Patent: Apr. 16, 2013

(54) METHOD FOR TRANSFERRING DATA FROM A SENSOR OVER A COMPUTER NETWORK, CORRESPONDING DEVICE, AND COMPUTER PROGRAM PRODUCT THEREFORE

(75) Inventors: Claudio Forlivesi, Brussels (BE); Johan Moreels, Strijtem-Roosdaal (BE)

(73) Assignee: Alcatel Lucent, Paris (FR)

( * ) Notice: Subject to any disclaimer, the term of this patent is extended or adjusted under 35 U.S.C. 154(b) by 406 days.

(21) Appl. No.: 12/406,564

(22) Filed: Mar. 18, 2009

(65) Prior Publication Data
US 2009/0240778 A1 Sep. 24, 2009

(30) Foreign Application Priority Data

Mar. 20, 2008 (EP) .................... 08300150

(51) Int. Cl.
*G06F 15/16* (2006.01)
*G06F 15/177* (2006.01)
*G06F 15/173* (2006.01)
*H04L 12/28* (2006.01)
*H03K 17/82* (2006.01)

(52) U.S. Cl.
USPC .......... 709/206; 709/218; 709/221; 709/223; 370/389; 307/413

(58) Field of Classification Search ........... 709/206, 709/218, 221, 223; 307/413; 370/389
See application file for complete search history.

(56) References Cited

U.S. PATENT DOCUMENTS

| | | | |
|---|---|---|---|
| 4,562,495 A * | 12/1985 | Bond et al. ............... | 360/78.04 |
| 6,628,663 B1 * | 9/2003 | Cromer et al. ............ | 370/463 |
| 6,994,432 B2 * | 2/2006 | Scofield et al. ........... | 347/105 |
| 2006/0258288 A1 | 11/2006 | Xie et al. | |
| 2007/0019569 A1 * | 1/2007 | Park et al. ................. | 370/254 |
| 2007/0169151 A1 * | 7/2007 | Vishloff et al. ........... | 725/62 |
| 2007/0266310 A1 | 11/2007 | Sasaki et al. | |
| 2007/0270671 A1 * | 11/2007 | Gal ............................ | 600/301 |
| 2007/0275690 A1 * | 11/2007 | Hunter et al. ............. | 455/404.2 |
| 2008/0020354 A1 * | 1/2008 | Goree et al. ............... | 434/11 |
| 2008/0285945 A1 * | 11/2008 | Rajakarunanayake et al. | 386/92 |

FOREIGN PATENT DOCUMENTS

| EP | 1 439 511 A1 | 7/2004 |
|---|---|---|
| EP | 1 939 827 A1 | 7/2008 |

OTHER PUBLICATIONS

European Search Report.

\* cited by examiner

*Primary Examiner* — Ranodhi Serrao
*Assistant Examiner* — Farrukh Hussain
(74) *Attorney, Agent, or Firm* — Fay Sharpe LLP

(57) ABSTRACT

The invention concerns a method for transferring data from a sensor over a computer network, wherein the method comprises the steps of receiving from the sensor a signal representing a physical quantity, encoding the signal, converting the signal into a message, and transmitting the message over the computer network, wherein the conversion of the signal into the message comprises the step of generating the message by combining a first message header with a message body, wherein the first message header comprises the encoded signal and the message body comprises application data. The invention further concerns a device and computer program product therefore.

8 Claims, 4 Drawing Sheets

200

201
```
GET /dumprequest.html HTTP/1.1
Host: my.host.com
User-Agent: Sensor-Enabled User Agent 1.0
Accept: text/xml,
    application/xml,
    application/xhtml+xml,
    text/html;q=0.9,
    text/plain;q=0.8,
    image/png,
    */*;q=0.5
Accept-Charset: ISO-8859-1,utf-8;q=0.7,*;q=0.7
Accept-Encoding: gzip,deflate
Accept-Language: it-it,it;q=0.8,en-us;q=0.5,en;q=0.3
Connection: Keep-Alive
Cache-Control: max-stale=0
```

202
```
X-Sensor-Tag: id=0xAB26511DE361FEED;
    class_id=0x36510BDDEA475611;
    data="5.743 +/- 0.001 metres";
    comment="Distance from Mona Lisa Painting"
```

INVITE sip:UAB@example.com SIP/2.0
Via: SIP/2.0/UDP 10.20.30.40:5060
From: UserA <sip:UAA@example.com>;tag=589304
To: UserB <sip:UAB@example.com>
Call-ID: 8204589102@example.com
CSeq: 1 INVITE
Contact: <sip:UserA@10.20.30.40>
Content-Type: application/sdp
Content-Length: 141

202

X-Sensor-Tag: id=0xAB26511DE361FEED;
    class_id=0x36510BDDEA475611;
    data="5.743 +/- 0.001 metres";
    comment="Distance from Mona Lisa Painting"

303 v=0
o=UserA 2890844526 2890844526 IN IP4 10.20.30.40
s=Session SDP
c=IN IP4 10.20.30.40
t=3034423619 0
m=audio 49170 RTP/AVP 0
a=rtpmap:0 PCMU/8000

401
```
<?xml version="1.0"?>
<soap:Envelope
xmlns:soap="http://www.w3.org/2001/12/soap-envelope"
soap:encodingStyle=
          "http://www.w3.org/2001/12/soap-encoding">
```

402
```
  <soap:Header xmlns:ss="http://www.alcatel-lucent/
                         com/cto/x-sensor-tags">
    <ss:X-Sensor-Tag
       soap:role="http://www.alcatel-lucent/
                  com/cto/x-sensor-tags/role"
       soap:mustUnderstand="1"
       soap:relay="1"
       id="0xAB26511DE361FEED"
       class_id="0x36510BDDEA475611"
       comment="Distance from Mona Lisa Painting">
    CDATA[2.743 +/- 0.001 metres]
    </ss:X-Sensor-Tag>
  </soap:Header>
```

403
```
<soap:Body xmlns:m="http://www.example.org/stock">
    <m:GetStockPrice>
       <m:StockName>IBM</m:StockName>
    </m:GetStockPrice>
  </soap:Body>
```

`</soap:Envelope>`

Fig. 4

METHOD FOR TRANSFERRING DATA FROM A SENSOR OVER A COMPUTER NETWORK, CORRESPONDING DEVICE, AND COMPUTER PROGRAM PRODUCT THEREFORE

The invention is based on a priority application EP 08 300 150.3 which is hereby incorporated by reference.

TECHNICAL FIELD

The invention relates to a method for transferring data from a sensor over a computer network, the method comprising the steps of receiving from the sensor a signal representing a physical quantity, encoding the signal, converting the signal into a message, and transmitting the message over the computer network, a device for transferring data from a sensor over a computer network, the device comprising means for receiving from the sensor a signal representing a physical quantity, means for converting the signal into a message, and means for transmitting the message over the computer network, and a computer program product comprising a computer usable medium including a computer readable program, wherein the computer readable program when executed on a computer causes the computer to receive from a sensor a signal representing a physical quantity, encode the signal, convert the signal into a message, and transmit the message over a computer network.

BACKGROUND OF THE INVENTION

A sensor is a device which measures a physical quantity and converts it into a signal which can be read by an observer or by an instrument. When referring to its capability of detecting a parameter in one form and reporting it in another (usually an electrical or digital signal), a sensor is sometimes referred to as a "transducer" in the art.

The industry and manufacturers move towards networked, preferably wireless systems for sensor connectivity to enhance automation and to lower life cycle costs. Furthermore, the military moves towards such networked sensors to improve condition-based maintenance. Sensor interoperability also plays a crucial role in applications such as remote monitoring, situation awareness, or geographic information systems known as sensor webs. By sensor web is meant an amorphous architecture of spatially distributed sensor platforms, so-called pods, that wirelessly communicate with each other to facilitate environmental monitoring and control.

Widespread industry standards for sensor interfacing are defined as IEEE 1451.2. Smart sensors, i.e. devices that include communications and signal processing capabilities in addition to the actual transducer, typically build upon these standards. Advanced implementations of the IEEE 1451 standards are known which support the transmission of sensor data according to World Wide Web Consortium (W3C) standards and recommendations such as HTTP or SOAP. One such implementation was published by the U.S. National Institute of Standards and Technology at the OMG-Robotics Working Group meeting in December 2006.

A downside of the known solution is its inability to transfer sensor and application data in a single network message. This makes it difficult to incorporate the transmission of sensor data into complex solution architectures with multiple interacting applications. An object of the invention is thus to propose an improved approach to sensor data transmission using state-of-the-art network protocols.

SUMMARY OF THE INVENTION

This object is achieved by a method for transferring data from a sensor over a computer network, the method comprising the steps of receiving from the sensor a signal representing a physical quantity, encoding the signal, converting the signal into a message, and transmitting the message over the computer network, a device for transferring data from a sensor over a computer network, the device comprising means for receiving from the sensor a signal representing a physical quantity, means for converting the signal into a message, and means for transmitting the message over the computer network, and a computer program product comprising a computer usable medium including a computer readable program, wherein the computer readable program when executed on a computer causes the computer to receive from a sensor a signal representing a physical quantity, encode the signal, convert the signal into a message, and transmit the message over a computer network.

The main idea of the invention is the transmission of sensor data by means of a network message header. By a header is meant supplemental data placed at the beginning of the network message. Headers are traditionally used to store and transmit information for the handling of the message.

By means of the outlined approach, sensor data can be transferred along with application data contained in the body of a message. By message body, sometimes called "payload" in the art, is meant the data following the message header.

Further developments of the invention can be gathered from the dependent claims and the following description.

BRIEF DESCRIPTION OF THE DRAWINGS

In the following the invention will be explained further making reference to the attached drawings.

To transfer sensor data over a computer network according to an embodiment of the invention, a signal representing a physical quantity is first received from the sensor. The signal is then converted into a message by encoding the signal into a message header and combining this header with a given or generated message body. Finally, the resulting message is transmitted over the computer network.

FIG. 2 shows an example of an HTTP request transmitted by a software program according to an embodiment of the invention.

FIG. 3 shows an example of a SIP INVITE request transmitted according to an embodiment of the invention.

FIG. 4 shows an example of a SOAP message transmitted according to an embodiment of the invention.

DETAILED DESCRIPTION OF PREFERRED EMBODIMENTS

Figure 1:
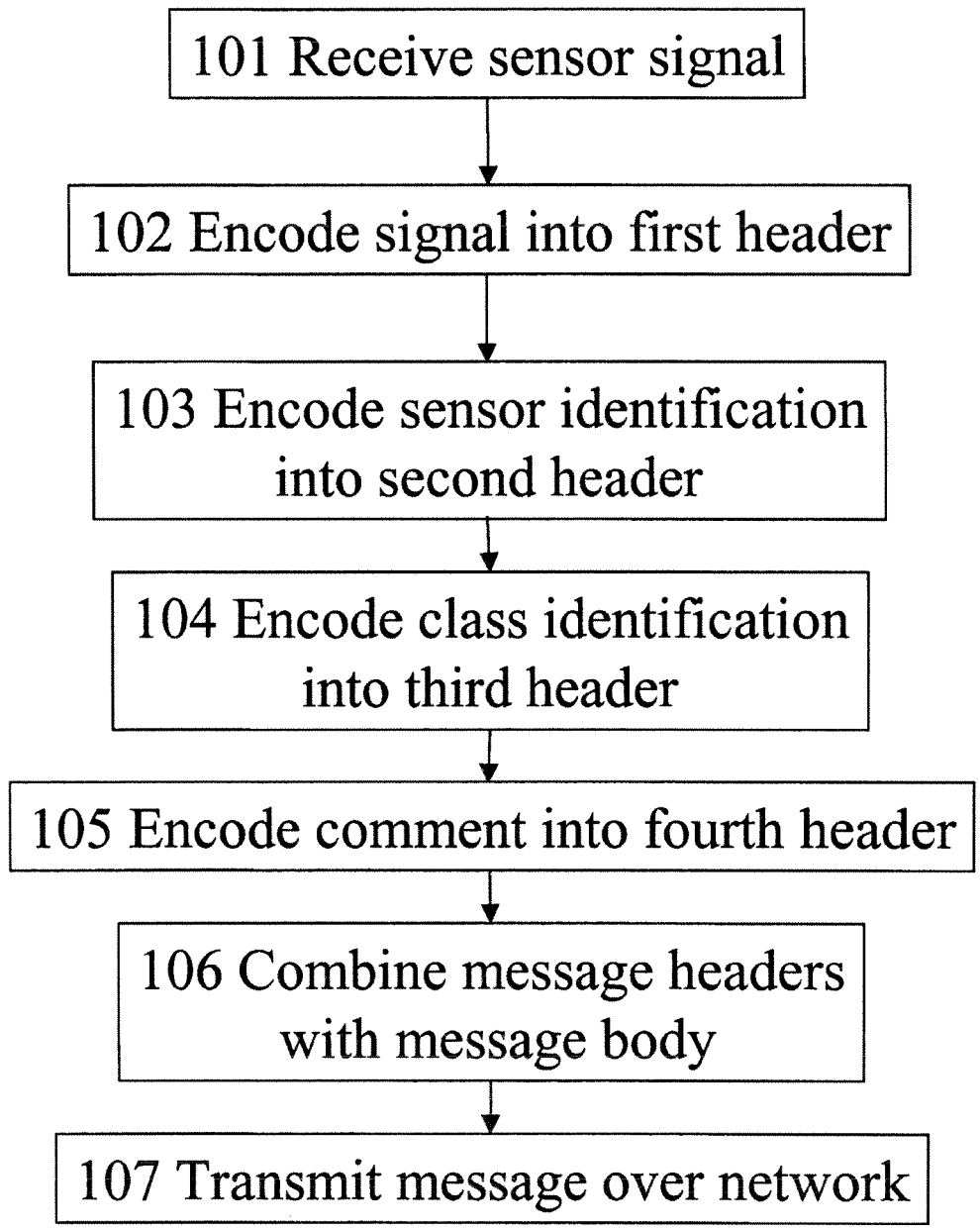
FIG. 1 schematically shows a method according to an embodiment of the invention for transferring sensor data over a computer network.

In the following, a method according to the invention is elucidated by way of example, referencing FIG. 1.

For illustrative purposes, the embodiment of the given example is assumed to take the form of a software program. It is understood that an alternative embodiment may take the form of a hardware device or a combination of software and hardware components.

In a first step 101, the software program receives a signal representing a distance from a proximity sensor to a target object. In the given example, the signal takes the form of an electrical voltage. The voltage may be defined only on a discrete set of times; in this case, the signal is referred to as a time series. Alternatively, the voltage may be a continuous-time signal. In addition, the signal may be analog or digital, depending mainly on the type of sensor employed.

In step 102, the program encodes the signal of step 101 into a first message header. In its encoded form, the first message header typically comprises an absolute measure of the physical quantity of step 101. This absolute measure may be supplemented by information such as a unit of measurement, precision, margin of error, confidence level, resolution, or full scale range of the sensor at hand. Such information can be used to indicate the engineering tolerance, that is, the permissible limit of variation in the physical quantity measured, to imply a numeric accuracy of the nominal value. For example, the signal originating from a distance sensor may be encoded in the form "2.743+/−0.001 meters", assuming a symmetrical tolerance.

Preferably, the encoding of step 102 results in a textual representation for use in a resulting text message. Depending on the underlying network protocol, such a text message may take the form of an HTTP request or response, a Session Initiation Protocol request or response (Session Initiation Protocol=SIP), a SOAP message, or a message according to the architectural style known as Representational State Transfer.

In step 103, to allow the recipient to identify the originating sensor, the embodiment of FIG. 1 encodes a sensor identification into a second message header. To ensure unambiguous identification of the sensor by the recipient without significant central coordination, the identification may take the form of a Universally Unique Identifier (UUID). A UUID is an identifier standard used in software construction, standardized by the Open Software Foundation as part of the Distributed Computing Environment. An advantage brought about by the use of UUIDs as sensor identification is the ability of the recipient to combine received sensor data into a single database without needing to resolve name conflicts. UUIDs are documented in ITU-T Rec. X.667|ISO/IEC 9834-8:2005. The IETF has published Proposed Standard RFC 4122 that is technically equivalent with ITU-T Rec. X.667|ISO/IEC 9834-8.

In step 104, to indicate to the recipient the type of information delivered by the sensor, the embodiment of FIG. 1 encodes a class identification into a third message header. That class identification comprises a description of the physical quantity of step 101, for example, temperature, speed, pressure, or voltage. The class identification further comprises operational conditions of the sensor, for example, the current state in case of a proximity sensor that requires starting from a known distance and accumulating incremental changes in measurement. Finally, the class identification indicates a data format of the message, particularly the message headers of steps 101 through 103. Instead of including these data explicitly in the third message header, an alternative embodiment may only supply a numerical or symbolic class identification and require the recipient to resolve it by consulting a public directory or central sensor class database. The IEEE 1451 standard provides an example of such a directory.

In step 105, to provide a human recipient with further information on the message or sensor data contained therein, the embodiment of FIG. 1 encodes a comment into a fourth message header. The comment is typically transmitted in human-readable form and may comprise semantic information on the physical quantity of step 101. An exemplary comment is "Distance from Mona Lisa painting" for a proximity sensor located in a museum of art.

It is understood that the information processed in steps 102 through 105 may alternatively be stored in a different set of message headers or compressed into a single message header without deviating from the spirit of the invention. In a further step (not depicted), some or all of the message headers may be encrypted for transport. Transport Layer Security and its predecessor, Secure Sockets Layer, are examples of cryptographic protocols commonly used for encrypting HTTP requests and responses.

In step 106, the program combines the message headers of steps 102 through 105 with a message body comprising application data for transferring along with the sensor data, resulting in a complete self-contained message according to the underlying network protocol. The order of message headers suggested by the numbering in steps 102 through 105 is in no way binding on the resulting message structure. The order of headers may be permuted arbitrarily without contravening the spirit of the invention.

Finally, in step 107, the program transmits the resulting message of step 106 over the computer network. Transmission makes use of the Transmission Control Protocol, User Datagram Protocol, Stream Control Transmission Protocol, or any other transport protocol suitable for the underlying network.

FIG. 2 shows an example of an HTTP request 200 transmitted by a software program according to an embodiment of the invention. In this case, the message headers of steps 102 through 105 according to FIG. 1 are represented using the HTTP-header and message-header protocol elements. The corresponding specifications define a number of HTTP headers themselves, and also provide for extension through the use of new HTTP field-name protocol elements. The embodiment makes use of the field-name "X-Sensor-Tag". The resulting sensor information header 202 is combined with the standardized HTTP headers 201 and prefixed to said application data.

FIG. 3 shows an example of an INVITE request 300 according to SIP, the request being transmitted according to a further embodiment of the invention. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. The IETF specifies SIP in Proposed Standard RFC 3261. Here, the sensor information header 202 is combined with the standardized SIP headers 301 and a SIP session description 303. The session description 303 complies with the Session Description Protocol, which is specified by the IETF in Proposed Standard RFC 2327. Transmitting request 300 invites the recipient to initiate an audio session described in session description 303.

FIG. 4 shows an example of a SOAP message 400 transmitted according to an even further embodiment of the invention. Here, a SOAP header 402 containing the acquired sensor information is combined with a SOAP body 403 containing a body element with a local name of "GetStockPrice". While the SOAP header 402 might be of use to SOAP intermediaries as well as the ultimate destination of the message, the body 403 contains the actual message payload. SOAP header 402 and SOAP body 403 are both contained in the SOAP envelope 401, the envelope 401 being the outermost element information item of the SOAP message 400.

An exemplary application of an embodiment of the invention is an audio, video, or multimedia guide system for a visitor attraction such as an art exhibition or museum collection. Such a guide provides a commentary to the exhibits displayed, normally through a handheld device like a Personal Digital Assistant (PDA) or smart phone. State-of-theart PDAs are typically equipped with web browser software as well as short-range over-the-air technology such as Bluetooth or radio-frequency identification (RFID). Assuming that a proximity sensor is mounted close to an exhibit, that sensor could transfer its data over the wireless network using a method according to the invention. Upon approaching the exhibit and associated sensor, the PDA could use the received sensor data for generating an HTTP request 200 to a web server provided by the museum or exhibition site. The returned HTTP response (not depicted) may then be used to display location-based information educating the user on the exhibit at hand. Alternative embodiments of the invention may use a SIP request or SOAP message instead of an HTTP request.

The invention claimed is:

1. A method for transferring data from a sensor over a computer network, the method comprising
   receiving from the sensor a signal representing a physical quantity, encoding the signal, converting the signal into a message, and transmitting the message over the computer network, wherein, in order to transfer the data along with application data, the conversion of the signal into the message comprises the step of
   generating the message by combining a first message header with a message body,
   and combining a second message header with the message body wherein the first message header comprises the encoded signal and the message body comprises the application data and the second message header comprises a sensor identification and wherein the first message header after encoding comprises an absolute measure and at least one of the following: a unit of measurement, a precision, a margin of error, a confidence level, a resolution, and a full scale range.

2. The method according to claim 1, wherein the sensor identification comprises a Universally Unique Identifier.

3. The method according to claim 1, wherein the method further comprises combining a third message header with the message body, the third message header comprising at least one of the following:
   a description of the physical quantity, an operational condition of the sensor, and an indication of a data format of the message.

4. The method according to claim 1, wherein the method further comprises combining a fourth message header with the message body, the fourth message header comprising a comment on the message for use by a recipient of the message.

5. The method according to claim 1, wherein the method further comprises encrypting at least one of the message headers.

6. The method according to claim 1, wherein the message is a text message and the method further comprises converting the signal into a textual representation of the physical quantity.

7. A device for transferring data from a sensor over a computer network, the device comprising:
   a receiver that is operative to receive, from the sensor, a signal representing a physical quantity,
   a converter that is operative to convert the signal into a message, and
   a transmitter that is operative to transmit the message over the computer network,
   wherein the converter comprises an encoder that is operative to encode the signal into a first message header and
   a generator that is operative to generate the message by combining the first message header with a message body, and combining a econd message header with the message body,
   wherein the first message header comprises the encoded signal and the message body comprises the application data,
   wherein the second message header comprises a sensor identification, and
   wherein the first message header after encoding comprises an absolute measure and at least one of the following:
   a unit of measurement, a precision, a margin of error, a confidence level, a resolution, and a full scale range.

8. A computer program product comprising a non-transitory computer usable medium including a computer readable program, wherein the computer readable program when executed on a computer causes the computer to
   receive from a sensor a signal representing a physical quantity, encode the signal, convert the signal into a message, and transmit the message over a computer network, wherein, to convert the signal into the message, the computer readable program causes the computer to
   generate the message by combining a first message header with a message body and by combining a second message header with the message body,
   wherein the first message header comprises the encoded signal and the message body comprises the application data,
   and the second message header comprising a sensor identification, and
   wherein the first message header after encoding comprises an absolute measure and at least one of the following:
   a unit of measurement, a precision, a margin of error, a confidence level, a resolution, and a full scale range.

* * * * *